united States Patent Office 3,703,425
Patented Nov. 21, 1972

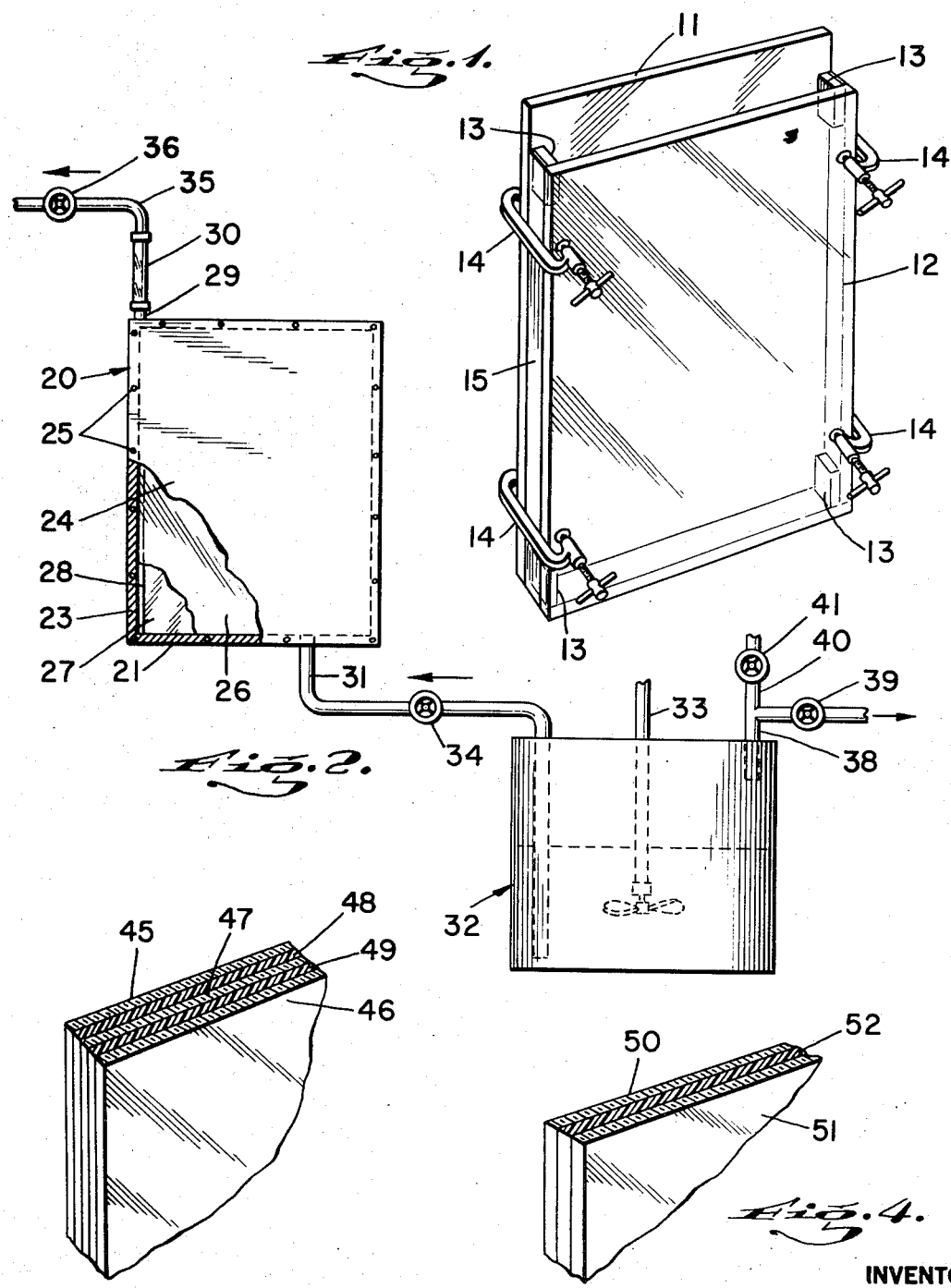

3,703,425
METHOD OF MAKING TRANSPARENT LAMINATED STRUCTURE HAVING TRANSPARENT INTERLAYER
John Delmonte, Glendale, Paul L. Meadows, Lakeview Terrace, and Augusto E. Benavides, Mission Hills, Calif., assignors to Furane Plastics Incorporated, Los Angeles, Calif.
Filed Apr. 29, 1969, Ser. No. 820,116
Int. Cl. B29c 19/00
U.S. Cl. 156—245        15 Claims

ABSTRACT OF THE DISCLOSURE

Laminated sheets of glass or rigid transparent synthetic plastic sheets for "safety glass" purposes are made by casting the interlayer between the rigid sheets, using certain liquid polyurethane prepolymers, curable at low temperatures. The specific polyurethanes for this purpose have high elastic properties and strong adhesion to the surfaces of the glass or other transparent sheets, which reduces the hazards of flying pieces when the laminate is broken by impact. The casting process has advantages in permitting the simultaneous making of margin gaskets and seals, and the embedment of mechanical or decorative parts.

---

This invention relates to transparent laminated sheet structures in which the interlayers between already formed glass or transparent plastic sheet stock comprise transparent cured polyurethane compositions, and to the method for making said structures.

One object of the invention is to provide transparent laminated structures of sheets of transparent synthetic plastics and/or glass, which structures have greatly improved mechanical properties, including improved resistance to shock shattering. Another object is to provide transparent laminated sheet structures which maintain mechanical strength and resistance to shock at the maximums of high and low atmospheric temperatures. A further object is to provide transparent laminated sheet structures having cast interlayers of variable thickness composed of cured transparent polyurethane compositions. Another object is to provide transparent laminated sheet structures which have high resistance to change in optical properties due to exposure to the ultraviolet light of sunlight. Still another object is to provide methods for making transparent laminated sheet structures of the kind described, wherein the interlayer is formed from a flowable curable transparent liquid polyurethane composition.

We have discovered that these and other desirable objects may be attained by introducing a flowable transparent liquid polyurethane composition containing certain curing agents between outer sheets of glass or transparent plastic such as sheets of polymethyl methacrylate or polycarbonates, which are spaced apart to give an interlayer of substantial thickness, followed by curing of the composition in place. The polyurethane compositions are selected to provide a tough interlayer of superior transparency, and having maximum adhesion to the surfaces of the outer sheets, providing in the laminate high tensile strength and resistance to shock fracturing.

Our process of casting the interlayer between rigid transparent plastic or glass sheets overcomes any irregularities in the sheets, and also permits the formation of integral seals and gaskets at the edge and on the edge margins of the laminate. The process also allows the placing of reinforcing, decorative or mechanical elements especially around the margins of the interspace prior to the casting of the liquid polyurethane composition between the outer rigid transparent sheets, thus embedding the mechanical elements.

The transparent sheet elements comprising the laminate may be of any desired thickness, and they may be contoured or shaped beforehand and spaced apart to provide the gap or gaps which are to be filled with the liquid polyurethane composition. The sheets may be laminated in pairs, or in multiple lamination.

The interlayer of polyurethane as formed in our process may be of substantial thickness, preferably at least 30 mils, and may be as thick as one-half inch or more. Where the term substantial thickness is used in the claims, it means in the range from about 5 mils to about 30 mils.

The outer sheets of the laminated structure, as well as any intermediate sheets where multiple laminations are involved, may be sheet glass, sheets of transparent synthetic plastics, particularly methyl methacrylates and its copolymers, polycarbonates, polyvinyl fluoride, and similar materials in sheet form. These rigid sheets may be used in any desired combinations of two or more sheets, and the sheets may be plane, or contoured or otherwise shaped prior to the introduction of the polyurethane interlayer compositions.

The laminated structure may be formed either by pouring the liquid urethane and curing agent composition into the space or spaces between supported sheets, or by evacuating the space and drawing the liquid composition up into the space, where it is then cured to a solid interlayer.

Apparatus which may be used to carry out these processes are shown in the accompanying drawings, in which FIG. 1 is a perspective view of an assembly of transparent rigid sheets, spacers, clamps and edge sealing means in which the interlayer of polyurethane may be formed and cured to give the laminated structure;

FIG. 2 is a diagrammatic arrangement of apparatus for producing laminated structures by a vacuum process;

FIG. 3 is a perspective fragmentary view of a multiple laminated sheet structure made in accordance with this invention; and FIG. 4 is a perspective fragmentary view showing a two sheet laminated structure including the transparent polyurethane interlayer.

Referring to the drawings, FIG. 1 shows the arrangement of the parts for forming a laminated structure. The back sheet 11, preferably slightly longer than the front sheet 12, is spaced from the front sheet by spacers 13 which hold the sheets 11 and 12 apart for the selected distance. The plates 11 and 12 with the intervening spacers 13 are then clamped together by C-clamps 14. The edges and bottom of the skeleton are then sealed with a putty-like sealant 15 which prevents leakage of the liquid urethane composition which is to be poured into the enclosed space.

The putty-like material may be silicone grease or putty, or alternatively strips of flexible urethane elastomers. Flexible plastic tubing may be inserted between the plates before clamping the structure together, to space the sheets apart for the forming of the interlayer, at the same time forming an edge sealing.

After the liquid urethane composition has been poured in, the entire unit is held in a room space or oven at the desired curing temperature, usually at 150° F. to 200° F., until a solid interlayer is formed. The clamps are then removed, and any unwanted edge material may be trimmed off.

In FIG. 2, there is shown, diagrammatically, an arrangement of equipment for introducing the liquid interlayer material by means of applied vacuum. The mold 20, consisting of an upright shallow metal box 21, having a flange 23, is provided with a cover 24 which may be held to the flange of the box by means of lag screws 25, to form a hermetically sealed container. The outer sheets 26 and 27 of the laminated structure to be formed are placed within the mold 20, these sheets being spaced apart by spacers 28 adjacent the edges of the sheets at the sides of the mold. The mold 20 is provided on its top edge with a pipe outlet 29, which is preferably provided with a transparent section or window 30 in which the liquid may be observed at the time that the mold has become full. An inlet pipe 31 is also provided in the bottom wall of the mold 20, this pipe leading to the bottom of the mixing tank 32. The urethane and curing agent liquids are mixed by means of a conventional stirrer means 33. A shut-off valve 34 is provided in the pipe line 31.

A preformed metal mold having grooves into which the edges of the rigid sheets may be positioned, may be employed with pliable gasket strips being employed to prevent leakage of the interlayer liquid.

The liquid composition for the polyurethane interlayer is to be prepared in the mixer tank. Then with the valve 34 closed, and the mold 20 assembled with the sheets 26 and 27 in the box 21, separated by the spacers 28, and the cover 24 attached by the screws 25 to hermetically seal the mold, the vacuum line 35 is put into communication with the mold by the opening of the valve 36. When the mold 20 has been evacuated, the valve 34 is opened and the liquid composition is drawn into the mold 20 into the space between the two sheets 26 and 27. The suction is stopped when the liquid is visible in the transparent window 30.

In the making of laminated structures in which utmost transparency is required, the removal of all bubbles in the liquid feed may be accomplished in the customary way by applying vacuum to the space over the liquid in an enclosed mixer tank until the liquid is free from gas bubbles. A pipe 38 with valve 39 is provided above the liquid level in the mixer tank 32, with a relief pipe 40, and relief valve 41, to break the vacuum when the bubbles have been eliminated, prior to the vacuum transfer of the liquid to the mold. Surface tension reduction agents may also be added. After the interlayer liquid has been introduced between the sheets 26 and 27 in the mold 20, the mold and contents are subjected to the required curing conditions to solidify the interlayer, after which the cover 24 of the mold is removed, and the laminated structure is removed. The edges of the structure may then be trimmed off to give a finished laminated sheet.

The viscosity of the composition used in the above described process is preferably under 60,000 centipoises when introduced between the rigid plates.

It will be understood that many variations in the structure and arrangement of the parts of the apparatus are possible within the scope of this invention, and these drawings are merely illustrative of the preferred pouring method and the preferred vacuum method.

FIG. 3 is a representation in perspective of a typical transparent multiple sheet lamination in which outer transparent sheets 45 and 46 and an intermediate sheet 47 are spaced apart by interlayers 48 and 49 of the cured transparent polyurethane composition.

FIG. 4 is a representation in perspective of a typical transparent laminated structure comprising outer plates 50 and 51 and an interlayer of cured transparent polyurethane composition 52 which fills the space between the plates.

The preferred urethane elastomer for forming the interlayer in our transparent laminated structures of this invention include either isocyanate terminated polyether prepolymers, or isocyanate terminated polyester prepolymers. The elastomers or their curing agents may be fluidized by external plasticizers such as tricresyl phosphate, chlorinated biphenyls, terphenyls, dimethyl phthalate, and others, and ultraviolet light absorbers or coloring agents may be included.

Since a considerable amount of time is required to prepare and manipulate the equipment for making the laminated structures, a long working life in the castable interlayer composition is a requisite. We prefer to use as curing agents aromatic amines such as 4,4'-methylene-bis-(2-chloroaniline) and derivatives thereof.

For a room temperature curing hardener in liquid form in which the prepolymer ingredient may be readily distributed, and also for long working life, we prefer to use as a solvent for the amine compound a N-substituted 2-pyrrolidone of the following formula—

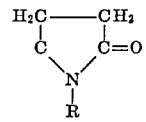

in which R may be a substituent of the class consisting of simple or substituted alkyl, alicyclic, aralkyl, alkaryl or aryl group. The preferred substituent is methyl, although ethyl, propyl, butyl or vinyl may also be used in the preparation of a non-crystallizing liquid amine hardener. Where room temperature curing is employed, the N-substituted 2-pyrrolidone remains in the final cured polyurethane resin and imparts a high degree of elasticity in the final product, as well as increasing the working life before cure is effected.

Examples of typical polyurethane compositions which have been used to prepare the laminates of this invention are:

EXAMPLE I

For room temperature curing, the laminate forming composition consists of 500 parts by weight of a high molecular weight triol, specifically polyoxypropylene, which has been reacted with 183 parts by weight of toluene diisocyanate to produce a prepolymer containing about 6 percent —NCO— content. This prepolymer designated Part A was then reacted with 20 parts by weight of an aromatic amine 4,4'-methylene-(2-chloroaniline) which has been dissolved in 10 parts by weight of N-methyl 2-pyrrolidone to give a non-crystallizing liquid, designated Part B. When the two compositions A and B were mixed in stoichiometric proportions, the gel time was about 40 to 50 minutes. The physical properties, after a cure of three days at room temperature, or after a cure of 16 hours at room temperature followed by three hours at 200° F., were as follows:

Tensile strength _____p.s.i__ 1500–2000
Elongation _____percent__ 350–400
Durometer hardness, A scale _____ 80–85

EXAMPLE II

For an interlayer in the laminated structures which had somewhat higher physical properties than Example I, and which require a high temperature cure, 500 to 750 parts by weight of propylene glycol of 1000 to 1500 molecular weight were reacted with from 183 to 213 parts by weight of toluene diisocyanate at temperatures not higher than 100° C. to form a prepolymer of 6 to 7 percent NCO content. This prepolymer, designated Part A, was then reacted with 20 parts by weight of 4,4'-methylene-bis-(2-chloroaniline) modified with 20 parts by weight of a solubilizing plasticizer to give a non-crystallizing liquid, designated Part B. When Parts A and B were mixed in stoichiometric proportions, the gel time was 60 to 70 minutes; and the cured resin had physical properties, when cured at 200° F. for 16 hours, as follows:

Tensile strength _____p.s.i__ 3000–3500
Elongation _____percent__ 400–450
Durometer hardness, A scale _____ 78–82

EXAMPLE III

For an interlayer in the laminate structures which had still higher mechanical strengths, and required higher than room temperature curing, 500 to 1000 parts by weight of polytetramethylene ether glycol of about 1000 to 2000 molecular weight were reacted with toluene diisocyanate, 90 to 260 parts by weight, at temperatures no higher than 100° C. to form a prepolymer of 6 to 8 percent NCO content. This prepolymer, designated Part A, was reacted with a polyamine (4,4') methylene bis - 2 - chloroaniline modified to give a non-crystallizing liquid, designated Part B. When Parts A and B were mixed in stoichiometric proportion, the composition had a 50–60 minutes gel time, at 75° F. When cured for 16 hours at 200° F., the cured resin had the following physical properties, at 75° F.:

Tensile strength _____ p.s.i.__ 4500–5000
Elongation _____ percent__ 450–500
Durometer hardness, A scale _____ 84–87

While the ingredients, the proportions thereof, and the processing times and temperatures in the three examples given are preferred as set forth, other equivalent ingredients may be employed, with the necessary adjustments of proportions and processing details. For example, other aromatic amines such as methylene dianiline, dichlorobenzidine, diamino diphenyl sulfone may be used, other plasticizers such as hydrocarbon oils, phosphates, esters, may be used, and other urethane prepolymers such as polypropylene glycol, polyethylene glycols, may be employed. In the practice of our invention we have used aliphatic and cycloaliphatic diisocyanates which have yielded non-yellowing transparent urethane elastomers which are more valuable in practicing our invention.

The advantages of our invention result from the unusual toughness and strong adhesion of the interlayer of selected polyurethane composition, as well as its superior transparency, and its consequent ability to securely hold fragments of glass in the event of breakage by impact against the laminated structure.

The polyurethane interlayer gives other improved properties for safety glass. The tensile elongation of one of these urethanes at −65° F. is over 100 percent, as compared to only 10 percent in the usual laminated safety glass and at 200° F. the polyurethane interlayer is greatly superior in both tensile strength and elongation.

The preferred methods of forming the interlayers by casting from the liquid phase also provides laminated structures which overcome irregularities in the outer plates, and gives the desired maximum adhesion and flexibility of the interlayer. In addition, these casting processes provide means for simultaneous formation of flanges and seals, the enclosing of mechanical inserts in the interlayers. The inserts may be for edge reinforcement, decoration, or for other uses, including for example in enclosing of antenna wires for radio frequency signals.

The preferred interlayer compositions may also be preformed into sheets cured to the B-stage, and used to produce rigid plate laminates, following the usual sheet laminating procedures, including keeping the laminated structure under pressure during the final heat curing period.

We claim:

1. The method of making transparent laminated sheets comprising the steps of placing rigid outer sheets of transparent material in spaced apart relation; sealing the assembly of sheets at their edges against leakage so that liquid material for the interlayer may be contained between the sheets and also forms an outwardly extending flange space which encompasses the edges of the rigid outer sheets; introducing a liquid urethane resin composition which is curable at low temperatures into the interspace between the outer sheets and said edge flange space adjacent the edges of said rigid sheets; and curing the urethane resin composition in place at low temperatures in the range of 120 to 200° F.

2. The method defined in claim 1, in which the spaced apart sheets are sealed at the edges by compressible plastic inserts.

3. The method defined in claim 1 in which the spaced apart sheets are sealed at the edges by a putty-like material.

4. The method defined in claim 1, in which the sealing of the edges of the rigid transparent sheets is effected by fitting the sheets into grooves of a preformed metallic mold.

5. The method defined in claim 1 in which the liquid urethane resin composition is introduced between the outer rigid transparent sheets by evacuation of said mold, followed by drawing in the liquid to fill the space between said sheets.

6. The method defined in claim 1 in which the liquid urethane resin composition is degassed, and then conveyed into the space between the outer rigid transparent sheets.

7. The method defined in claim 1 in which the liquid urethane resin composition is an isocyanate terminated prepolymer and a non-crystallizing solution of an aromatic amine curing agent.

8. The method defined in claim 1 in which the rigid outer sheets are transparent plastics consisting primarily of polymethylmethacrylate.

9. The method defined in claim 1, in which porous glass or nylon tapes are inserted along the edges and become an integral part of the cast urethane assembly.

10. The method defined in claim 7 in which the liquid urethane resin composition comprises an isocyanate terminated polyether prepolymer.

11. The method defined in claim 7 in which the liquid urethane resin composition comprises an isocyanate terminated polyester prepolymer.

12. The method defined in claim 7 in which the liquid urethane resin composition comprises a prepolymer of polypropylene glycol reacted with toluene diisocyanate, and having a —NCO— content of about six percent.

13. The method defined in claim 7 in which the liquid urethane resin composition comprises a prepolymer of 1000 to 1500 molecular weight polypropylene glycol reacted with toluene diisocyanate, and having a —NCO— content in the range of about 6 to 7 percent.

14. The method defined in claim 7 in which the liquid urethane resin composition comprises a prepolymer of 1000 to 2000 molecular weight polytetramethylene ether glycol reacted with toluene diisocyanate, and having a —NCO— content in the range of about 6 to 8 percent.

15. The method defined in claim 7 in which the aromatic amine curing agent is selected from the group consisting of 4,4' - methylene-bis-(2-chloroaniline) and derivatives thereof.

References Cited

UNITED STATES PATENTS

| | | | |
|---|---|---|---|
| 3,157,563 | 11/1964 | Baum | 156—99 |
| 3,382,137 | 5/1968 | Schreiber et al. | 156—99 X |
| 3,470,049 | 9/1969 | Reusch | 156—145 |
| 3,486,867 | 12/1969 | Wilson | 156—145 |
| 3,522,142 | 7/1970 | Wismer et al. | 156—99 X |

CARL D. QUARFORTH, Primary Examiner

S. J. LECHERT, Jr., Assistant Examiner

U.S. Cl. X.R.

156—99, 104, 107, 286, 331